(12) United States Patent
Jaksa et al.

(10) Patent No.: US 12,483,964 B2
(45) Date of Patent: Nov. 25, 2025

(54) MULTIPATH COMMUNICATION AND CONTROL

(71) Applicant: Comcast Cable Communications, LLC, Philadelphia, PA (US)

(72) Inventors: Robert Jaksa, Irving, TX (US); Ana Lucia Pinheiro, Allen, TX (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 421 days.

(21) Appl. No.: 18/093,686

(22) Filed: Jan. 5, 2023

(65) Prior Publication Data

US 2024/0236807 A1    Jul. 11, 2024

(51) Int. Cl.
*H04W 40/12* (2009.01)

(52) U.S. Cl.
CPC .................................. *H04W 40/12* (2013.01)

(58) Field of Classification Search
None
See application file for complete search history.

(56) References Cited

U.S. PATENT DOCUMENTS

| | | | |
|---|---|---|---|
| 8,098,818 B2 | 1/2012 | Grilli et al. | |
| 10,135,746 B2 | 11/2018 | Ho et al. | |
| 10,516,990 B2 | 12/2019 | Wane | |
| 11,356,897 B2 * | 6/2022 | Salkintzis | H04W 28/0942 |
| 11,432,357 B2 | 8/2022 | Wang | |
| 11,503,025 B2 | 11/2022 | Westerling | |
| 11,528,218 B2 * | 12/2022 | Kolar | H04L 43/0882 |
| 11,540,184 B1 * | 12/2022 | Marupaduga | H04W 36/08 |
| 11,564,132 B2 | 1/2023 | Suh et al. | |
| 11,689,966 B2 | 6/2023 | Sahin et al. | |
| 11,736,224 B2 | 8/2023 | Wang et al. | |
| 11,758,460 B1 | 9/2023 | Myron et al. | |
| 12,199,851 B2 * | 1/2025 | Tian | H04L 43/106 |
| 2003/0171112 A1 | 9/2003 | Lupper et al. | |

(Continued)

FOREIGN PATENT DOCUMENTS

| | | |
|---|---|---|
| CN | 106664558 B | 1/2020 |
| JP | 2019153151 | 9/2019 |

(Continued)

OTHER PUBLICATIONS

3rd Generation Partnership Project; Technical Specification Group Core Network and Terminals; 5G System; Access Traffic Steering, Switching and Splitting (ATSSS); Stage 3, 2021, Release 17.

(Continued)

*Primary Examiner* — Brian S Roberts
(74) *Attorney, Agent, or Firm* — Ballard Spahr LLP

(57) ABSTRACT

Disclosed are improvements in communication methods and techniques where more than one communication path is available. The methods include determining a first throughput of the first path. The first throughput may be based on a first path of a connection, a mode selection, and analysis of a first packet configured to determine a parameter of the first path. The methods may include determining a second throughput, and the methods may further include sending a third packet comprising data of an application. The third packet may be based on the first throughput and the second throughput.

41 Claims, 11 Drawing Sheets

(56) References Cited

U.S. PATENT DOCUMENTS

| | | | |
|---|---|---|---|
| 2006/0153135 A1 | 7/2006 | Ascolese et al. | |
| 2011/0128918 A1* | 6/2011 | Zhai | H04L 45/125 370/328 |
| 2012/0093150 A1 | 4/2012 | Kini | |
| 2012/0287781 A1 | 11/2012 | Maria | |
| 2012/0320989 A1* | 12/2012 | Ameres | H04N 19/13 375/240.18 |
| 2013/0065557 A1 | 3/2013 | Zhang et al. | |
| 2013/0122906 A1 | 5/2013 | Klatt | |
| 2013/0166507 A1 | 6/2013 | Staczek | |
| 2014/0141763 A1 | 5/2014 | Suh et al. | |
| 2015/0138962 A1 | 5/2015 | Tipton et al. | |
| 2015/0296415 A1 | 10/2015 | Ling et al. | |
| 2015/0312383 A1 | 10/2015 | Roeland et al. | |
| 2018/0206081 A1 | 7/2018 | Kim et al. | |
| 2018/0278545 A1 | 9/2018 | Andreoli-Fang | |
| 2018/0279203 A1 | 9/2018 | da Silva et al. | |
| 2019/0007826 A1 | 1/2019 | Wane | |
| 2019/0010702 A1 | 1/2019 | Lloyd | |
| 2019/0058798 A1 | 2/2019 | Lentz et al. | |
| 2019/0098488 A1 | 3/2019 | Syed et al. | |
| 2019/0246334 A1 | 8/2019 | Wang et al. | |
| 2019/0261261 A1 | 8/2019 | Ishii | |
| 2019/0306068 A1 | 10/2019 | Kiss et al. | |
| 2019/0357119 A1 | 11/2019 | Hong et al. | |
| 2020/0084835 A1 | 3/2020 | Wang et al. | |
| 2020/0236149 A1 | 7/2020 | Mufti et al. | |
| 2020/0314629 A1 | 10/2020 | Kreishan | |
| 2020/0367306 A1 | 11/2020 | Wang | |
| 2020/0413466 A1 | 12/2020 | Yu | |
| 2021/0195408 A1 | 6/2021 | Yang et al. | |
| 2021/0234729 A1 | 7/2021 | Cloonan et al. | |
| 2021/0274339 A1 | 9/2021 | Sevindik et al. | |
| 2022/0053406 A1* | 2/2022 | Lee | H04W 40/22 |
| 2022/0086742 A1 | 3/2022 | Arrobo Vidal et al. | |
| 2022/0110177 A1 | 4/2022 | Choksi et al. | |
| 2022/0167221 A1 | 5/2022 | Lee | |
| 2022/0232366 A1 | 7/2022 | Seo | |
| 2022/0345887 A1 | 10/2022 | Karampatsis et al. | |
| 2022/0417841 A1 | 12/2022 | Chak et al. | |
| 2023/0012793 A1 | 1/2023 | Chak et al. | |
| 2023/0095401 A1 | 3/2023 | Sivanesan et al. | |
| 2023/0216852 A1 | 7/2023 | Salkintzis | |
| 2023/0217230 A1 | 7/2023 | Sood et al. | |
| 2023/0230069 A1 | 7/2023 | Voorhees et al. | |
| 2023/0232198 A1 | 7/2023 | Salkintzis | |
| 2023/0269556 A1 | 8/2023 | Li et al. | |
| 2023/0284126 A1 | 9/2023 | Nayak et al. | |
| 2023/0319685 A1 | 10/2023 | Talebi Fard et al. | |
| 2023/0328593 A1 | 10/2023 | Qiao et al. | |

FOREIGN PATENT DOCUMENTS

| | | |
|---|---|---|
| WO | 2013166507 A1 | 11/2013 |
| WO | 2018206081 A1 | 11/2018 |
| WO | 2019010702 A1 | 1/2019 |
| WO | 2019095191 A1 | 5/2019 |

OTHER PUBLICATIONS

Bonaventure et al., "O-RTT TCP Convert Protocol; rfc8803.txt," 0-RTT TCP Convert Protocol; RFC8803.txt, Internet Engineering Task Force, IETF; 2020, https://tools.ietf.org/html/rfc8803.

ETSI TS 123 501 V15.2.0 Release 15, 3GPP TS 23.501, "Systems Architecture for the 5G System," 2018.

ETSI TS 123 502 V15.2.0 Release 15, 3GPP TS 23.502, "Procedures for the 5G System," 2018.

Ford, A. et al. "TCP Extensions for Multipath Operation with Multiple Addresses," Internet Engineering Task Force (IETF), 2013.

"5G; Security Architecture and Procedures for 5G System (3GPP TS 33.501 version 16.8.0 Release 16)," ETSI Technical Specification, European Telecommunications Standards Institute (ETSI), vol. 3GPP SA, No. V16.8.0, Sep. 27, 2021, http://www.etsi.org/deliver/etsi_ts/133500_133599/133501/16.08.00_60/ts_133501v160800p.pdf (259 pages).

W. Dong et al., "IDEAL: Incentivized Dynamic Cellular Offloading via Auctions," in IEEE/ACM Transactions on Networking, vol. 22, No. 4, pp. 1271-1284, Aug. 2014, doi: 10.1109/TNET.2013.2273766. Website: <https://ieeexplore.ieee.org/abstract/document/> 6582689 (Year: 2014).

* cited by examiner

800

| Information name | Description | Category | SMF permitted to modify in a PDU context | Scope |
|---|---|---|---|---|
| Rule identifier | Unique identifier to identify the ATSSS Rule | Mandatory | No | PDU context |
| Rule Precedence | Determines the order in which the ATSSS rule is evaluated in the UE. | Mandatory (NOTE 1) | Yes | PDU context |
| Traffic Descriptor | *This part defines the Traffic descriptor components for the ATSSS rule.* | Mandatory (NOTE 2) | | |
| Application descriptors | One or more application identities that identify the application(s) generating the traffic (NOTE 3). | Optional | Yes | PDU context |
| IP descriptors (NOTE 4) | One or more 5-tuples that identify the destination of IP traffic. | Optional | Yes | PDU context |
| Non-IP descriptors (NOTE 4) | One or more descriptors that identify the destination of non-IP traffic, i.e. of Ethernet traffic. | Optional | Yes | PDU context |
| Access Selection Descriptor | *This part defines the Access Selection Descriptor components for the ATSSS rule.* | Mandatory | | |
| Steering Mode | Identifies the steering mode that should be applied for the matching traffic and associated parameters. | Mandatory | Yes | PDU context |
| Steering Mode Indicator | Indicates either autonomous load-balance operation or UE-assistance operation if steering mode is set to "Load Balancing". | Optional | Yes | PDU context |
| Threshold Values | A Maximum RTT and/or a Maximum Packet Loss Rate and/or Minimum Throughput. | Optional | Yes | PDU context |
| Steering Functionality | Identifies whether the MPTCP functionality or the ATSSS-LL functionality should be applied for the matching traffic. | Optional (NOTE 5) | Yes | PDU context |

802 → Steering Mode
804 → Steering Mode Indicator
806 → Threshold Values

MULTIPATH COMMUNICATION AND CONTROL

BACKGROUND

Network operators provide access to networks, such as local networks and the Internet. Some network operators may provide multiple types of services for access. For example, a multiple service operator (MSO) may provide access through both Wi-Fi (e.g., IEEE 802.11 based protocols) access points and cellular nodes (e.g., 3GPP 5G Node B). A mobile network operator (MNO) may provide access to networks and the Internet through cellular nodes. Connection-based communications may cause conflicts and opportunities for improved communications where multiple communication paths are available. These and other communications may further challenge signaling and control associated with such networks.

SUMMARY

The present invention relates to methods, apparatuses, and systems for network accessibility. For a better understanding of the underlying concepts, there follows specific non-limiting examples:

A multipath connection may be formed to connect one or more endpoints with the freedom to transmit data over different paths. Some endpoints may lack support for multipath communications, and a transport converter may provide backwards compatibility for endpoints that do not support multipath communications. The transport converter may provide multipath availability to those endpoints or portions of the connections that support multipath connections.

A policy may be used to control endpoint and node multipath capabilities. For example, a policy may include rules that defines a mode of traffic steering or a procedure for determining path quality. Rules may be based on a variety of network parameters and combinations thereof. For example, a rule may require that path quality is defined by a throughput of the path. The throughput of the path may be based on other packets constructed for determining other parameters. For example, the throughput may be determined based on a packet configured for determining a round trip time or a packet for determining the ratio of packets lost over the path. The throughput may also be determined based on monitoring packets comprising user data or a combination of packets constructed for determining other parameters and packets comprising user data. And, throughput determinations may be dependent on the path being idle or having traffic less than a threshold. One of the paths of the multipath connection may be chosen for data transmission or a particular type of data to be transmitted based on the throughput, other parameters, modes, or a combination thereof.

BRIEF DESCRIPTION OF THE DRAWINGS

In order to provide understanding techniques described, the figures provide non-limiting examples in accordance with one or more implementations of the present disclosure, in which:

FIG. 8 illustrates an example policy in accordance with one or more implementations of the present disclosure;

DETAILED DESCRIPTION

Figure 1:
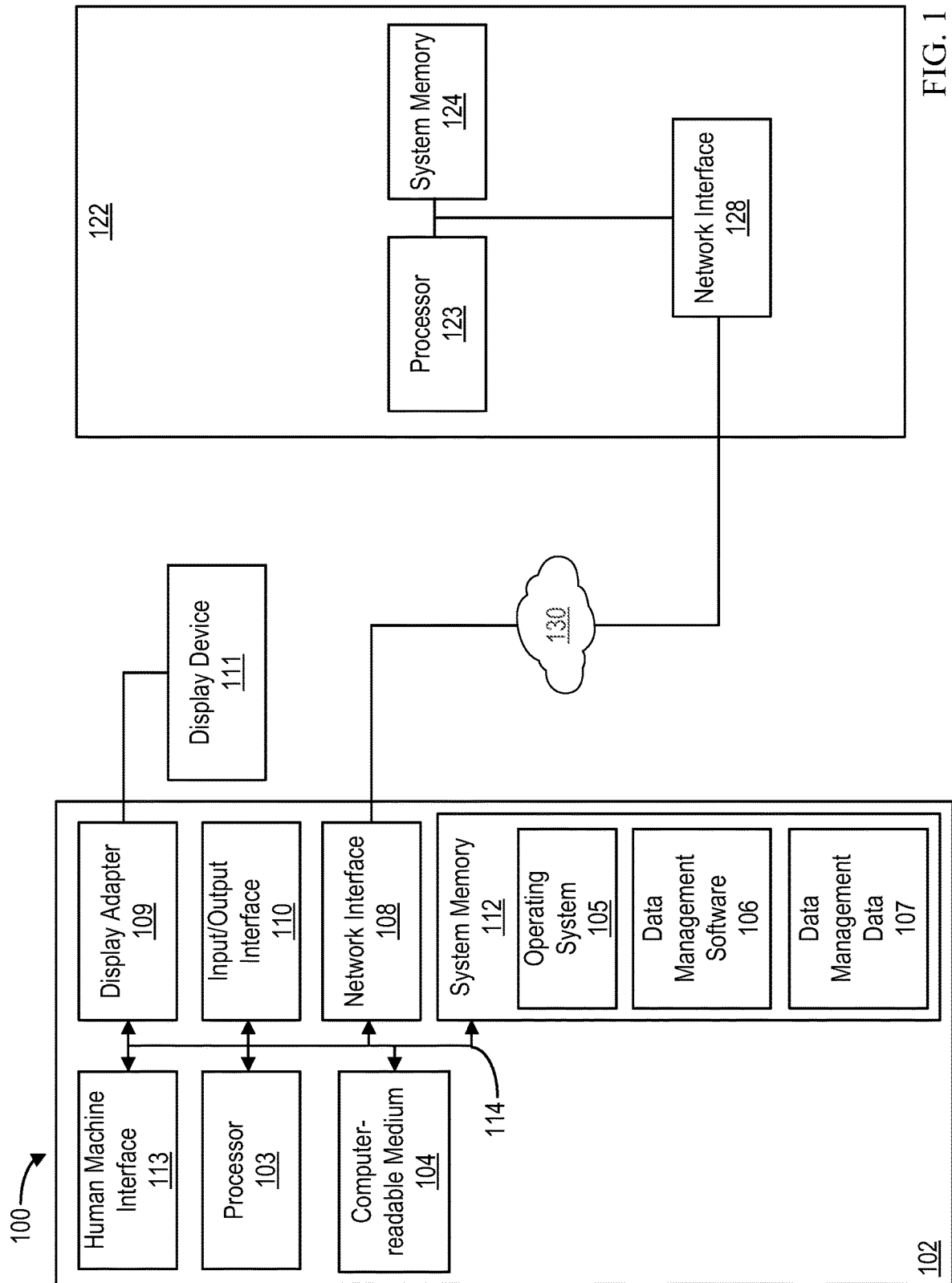
FIG. 1 illustrates an example system in accordance with one or more implementations of the present disclosure.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

As will be appreciated by one skilled in the art, hardware, software, or a combination of software and hardware may be implemented. Furthermore, a computer program product on a computer-readable storage medium (non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a special purpose computer or other programmable data processing instrument to produce a machine, such that the processor-executable instructions which execute on the computer or other programmable data processing instrument create a device for implementing the steps specified in the flowchart block or blocks.

These processor-executable instructions may also be stored in a non-transitory computer-readable memory or a computer-readable medium that may direct a computer or other programmable data processing instrument to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing instrument to cause a series of operational steps to be performed on the computer or other programmable instrument to produce a computer-implemented process such that the processor-executable instructions that execute on the computer or other programmable instrument provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

The method steps recited throughout this disclosure may be combined, omitted, rearranged, or otherwise reorganized with any of the figures presented herein and are not intend to be limited to the four corners of each sheet presented.

The techniques disclosed herein may be implemented on a computing device in a way that improves the efficiency of its operation. As an example, the methods, instructions, and steps disclosed herein improve the functioning of a computing device.

A multipath connection may be formed to connect one or more endpoints with the freedom to transmit data over different paths. Some endpoints may lack support for multipath communications, and a transport converter may provide backwards compatibility for endpoints that do not support multipath communications. The transport converter may provide multipath availability to those endpoints or portions of the connections that support multipath connections.

As multipath communications proliferate, throughput may become an important consideration for path selection. For example, a path may have an acceptable round trip time or packet loss ratio without having the bandwidth necessary for high throughput tasks (e.g., video, bulk data transfer), which may lead to the unnecessary use of certain paths that may be high cost or having different subscription requirements (e.g., data caps). Technical solutions to these and other issues facing communication command and control are presented herein.

For example, a policy may be used to control multipath capabilities. For example, a policy may include rules that define a mode of traffic steering or a procedure for determining path quality. Rules may be based on a variety of network parameters and combinations thereof. For example, a rule may require that path quality is defined by a throughput of the path. The throughput of the path may be based on other packets constructed for determining other parameters. For example, the throughput may be determined based on a packet configured for determining a round trip time or a packet for determining the ratio of packets lost over the path. As throughput determinations may be dependent on the path being idle or having traffic less than a threshold.

FIG. 1 shows a system 100 in accordance with one or more applications of the present disclosure. The user device 102 may comprise one or more processors 103, a system memory 112, and a bus 114 that couples various components of the user device 102 including the one or more processors 103 to the system memory 112. In the case of multiple processors 103, the user device 102 may utilize parallel computing.

The bus 114 may comprise one or more of several possible types of bus structures, such as a memory bus, memory controller, a peripheral bus, an accelerated graphics port, and a processor or local bus using any of a variety of bus architectures.

The user device 102 may operate on and/or comprise a variety of user device readable media (non-transitory). User device readable media may be any available media that is accessible by the user device 102 and comprises, non-transitory, volatile and/or non-volatile media, removable and non-removable media. The system memory 112 has user device readable media in the form of volatile memory, such as random access memory (RAM), and/or non-volatile memory, such as read only memory (ROM). The system memory 112 may store data such as data 107 and/or programs such as operating system 105 and software 106 that are accessible to and/or are operated on by the one or more processors 103.

The user device 102 may also comprise other removable/non-removable, volatile/non-volatile user device storage media. The computer-readable medium 104 may provide non-volatile storage of user device code, user device readable instructions, data structures, programs, and other data for the user device 102. The computer-readable medium 104 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of programs may be stored on the computer-readable medium 104. An operating system 105 and software 106 may be stored on the computer-readable medium 104. One or more of the operating system 105 and software 106 (e.g., mobile applications), or some combination thereof, may comprise program and the software 106. Data 107 may also be stored on the computer-readable medium 104. Data 107 may be stored in any of one or more databases known in the art. The databases may be centralized or distributed across multiple locations within the network 130.

A user may enter commands and information into the user device 102 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 103 via a human machine interface 113 that is coupled to the bus 114, but may be connected by other interface and bus structures, such as a parallel port, game port, an IEEE 1394 Port (also known as a Firewire port), a serial port, network interface 108, and/or a universal serial bus (USB).

A display device 111 may also be connected to the bus 114 via an interface, such as a display adapter 109. It is contemplated that the user device 102 may have more than one display adapter 109 and the user device 102 may have more than one display device 111. A display device 111 may be a monitor, an LCD (Liquid Crystal Display), light emitting diode (LED) display, television, smart lens, smart glass, and/or a projector. In addition to the display device 111, other output peripheral devices may comprise components such as speakers (not shown) and a printer (not shown) which may be connected to the user device 102 via Input/Output Interface 110. Any step and/or result of the methods may be output (or caused to be output) in any form to an output device. Such output may be any form of visual representation, including, but not limited to, textual, graphical, animation, audio, tactile, and the like. The display device 111 and user device 102 may be part of one device, or separate devices.

The user device 102 may operate in a networked environment using logical connections to one or more computing devices 122. A computing device 122 may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the user device 102 and a computing device 122 may be made via a network 130. Such network connections may be through a network interface 108. A network interface 108 may be implemented in both wired and wireless environments.

Application programs and other executable program components such as the operating system 105 are shown herein as discrete blocks, although it is recognized that such programs and components may reside at various times in different storage components of the user device 102, and are executed by the one or more processors 103 of the user device 102. The computing device 122 may include all of the components described with regard to the user device 102.

The user device 102 may one or more components configured to communicate over electromagnetic waves or other mediums. The user device 102 may be configured with one or more subscriber identity modules (SIM). The SIM may be stored in persistent memory, embedded, physical, or combinations thereof. In such a way, the SIM may form a credential circuit as data stored permanently or otherwise on the user device 102. The SIM may be configured for Dual SIM Dual Standby (DSDS). For example, the primary SIM of the DSDS may be a physical SIM (pSIM) and the secondary SIM may be an embedded SIM (eSIM). The SIM may include one or more pairs of unique identifiers and keys. Information may be stored on a particular chip or combinations of chips, the computer-readable medium 104, or otherwise.

The user device 102 is configured to communicate over a network interface 108. The network interface 108 may be configure with a radio or other electromagnetic spectrum transceiver. The network interface 108 may be combined with a SIM, and identification numbers (e.g., international mobile subscriber identity, local area identity) and keys therein (e.g., $k_i$), for secure communications.

The user device 102 may communicate with the computing device 122 over a network 130. Such communication paths may include wired communication technologies, wireless communication technologies, or combinations thereof. Wireless communication technologies may include various 3GPP standards (e.g., LTE, 5G) and Institute of Electrical and Electronics Engineers (IEEE) standards (e.g., 802.11). Wired communication technologies may include various IEEE standards (e.g., 802.3). While various communication technologies and standards are contemplated herein, various communication mediums (e.g., wire, air), standards making bodies (e.g., 3GPP, IETF, IEEE), and protocols are contemplated herein.

Communications protocols contemplated herein may be connectionless or connection-based. For example, Transmission Control Protocol (TCP) may be used to establish state-based or connection-based communication between a client (e.g., user device 102), a computing device 122, or components, hops, nodes, instances, functions there between, or combinations thereof. A protocol may define header and payload information for packets of information. Headers may define various configurations and settings associated with the transmitted payload. User Datagram Protocol (UDP) may be similarly used to and configured to provide a connection-based protocol (e.g., QUIC). Other protocols (e.g., Datagram Congestion Control Protocol (DCCP)) are contemplated for use in accordance with one or more implementations of the present disclosure.

Figure 2:
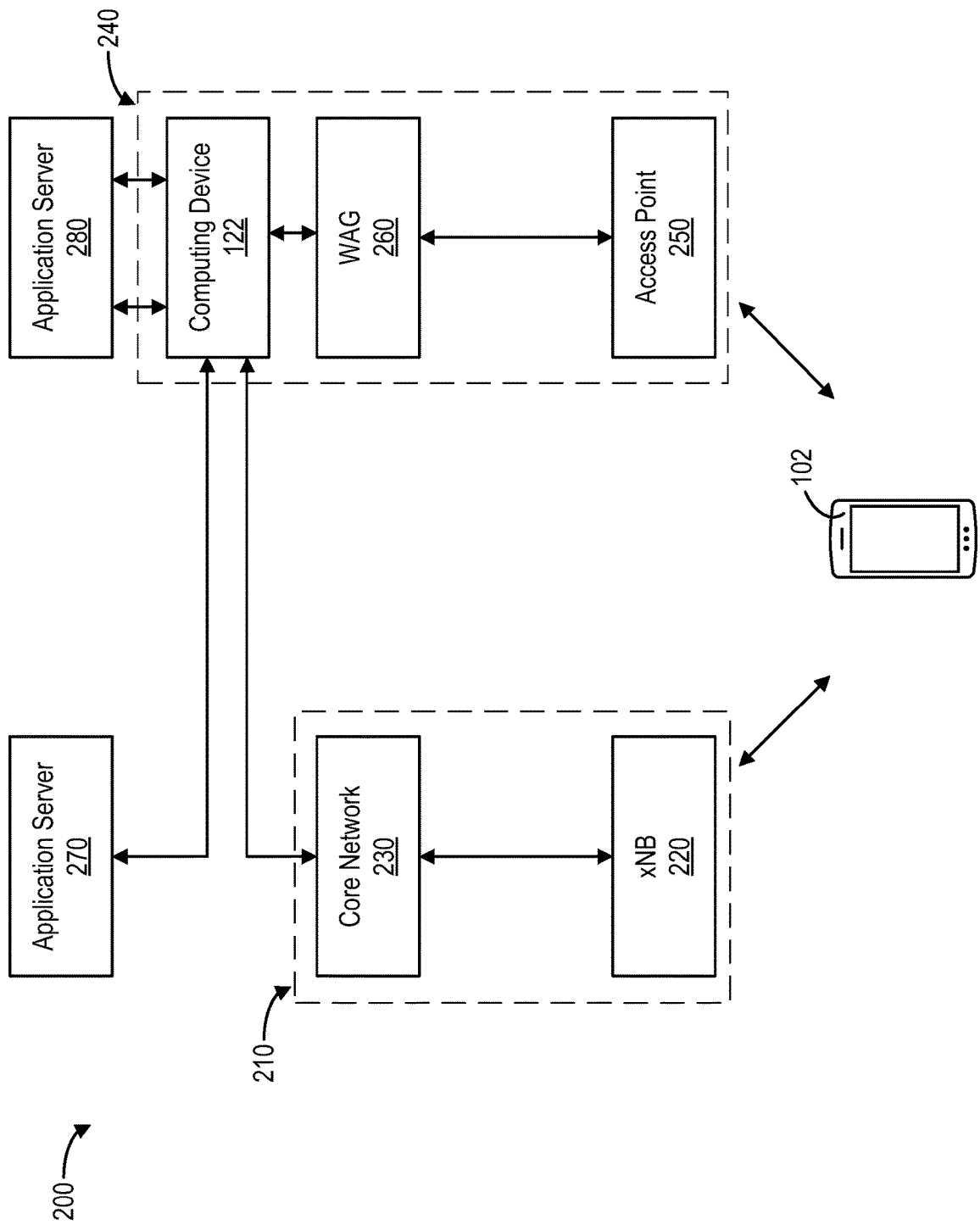
FIG. 2 illustrates an example communication architecture in accordance with one or more implementations of the present disclosure.

Referring to FIG. 2, a network 210 (e.g., a network of an MNO) may include wireless communication protocols between user device 102 and the cellular base station 220 (e.g., eNB, gNB, xNB), which may be part of a radio access network based on various radio access technologies. The base station 220 may be considered an origin of a connection because it is the outward facing node from the network 210 to the user device 102. That is, an origin may be a node of a network (e.g., network 210) that communicates with devices off of the network (e.g., user device 102, application server 270). The origin may be an edge node or device. The radio access network may be associated with a network. A network (e.g., public land mobile network (PLMN)) may maintain the radio access network and the associated core network 230. The network (e.g., an MNO) may issue subscriptions for the user device 102 to access the network 210. The network may include communications hardware and software to support various protocols and components (e.g., 3GPP 5G, IEEE 802.11). The terms MVNO, MSO, PLMN, MNO, and other operator indicators are intended for designation (e.g., first, second, third) to distinguish between different networks and are not intended to be rigid as terminology and scope of these and other terms is evolving in the field.

Another communication path may be established between user device 102 and computing device 122 over a network 240 (e.g., a network of an MSO) having a Wi-Fi or IEEE 802.11 access point 250. The access point 250 may be configured to communicate with a wireless access gateway 260. The access point 250 may be considered an origin of a connection because it is the outward facing node from the network 240 to the user device 102. That is, an origin may be a node of a network (e.g., network 240) that communicates with devices off of the network (e.g., user device 102, application server 270). The wireless access gateway 260 may route data packets from the access point 250 to the network 130. A network (e.g., an MSO) may maintain the access point 250 and the associated wireless access gateway 260. The network may issue subscriptions for the user device 102 to access one or more of the networks (e.g., network 210, network 240). The subscriptions may be issued in packages (e.g., subscription packages) and stored or unpacked on a SIM, an embedded SIM, or otherwise. The network associated with the access point 250 may be different than the network associated with the radio access network.

A communication path may be defined by the individual hops made alone the path between components, instances, functions, servers, and interfaces. A path may be unique in that the set of hops are unique. For example, a path comprising hopes between A, B, and C may be considered unique from a path that consists of A and B or a path that comprises A, B, and D. A network may be defined as a set of components, instances, functions, servers, interfaces, other implements and combinations thereof that are configured to communicate or have access to communicate with one another. The network may consist of those components, instances, functions, servers, interfaces, other implements and combinations that are managed by a network provider and configured to communicate. A network may be a logical grouping of the set (e.g., subnet). A network may be virtually grouped logically (e.g., virtual private network) or contain portions that are virtually grouped logically.

The communication paths may include wired communication technologies, wireless communication technologies, or combinations thereof. Wireless communication technologies may include various 3GPP standards (e.g., LTE, 5G) and Institute of Electrical and Electronics Engineers (IEEE) standards (e.g., 802.11). Wired communication technologies may include various IEEE standards (e.g., 802.3). While various communication technologies and standards are contemplated herein, various communication mediums (e.g., wire, air), standards making bodies (e.g., 3GPP, IETF, IEEE), and protocols are contemplated herein.

The core network 230 and wireless access gateway 260 are used as examples for context. It should be appreciated that standards may change the names of these entities as technologies improve and progress. The core network 230 and the wireless access gateway 260 may be configured to directly communicate over an interface. For example, an access and mobility function (AMF), session management function (SMF), policy control function (PCF), other functions or instances, or combinations thereof may perform some or all of the steps described herein. The computing device 122 may be configured to perform all or some of the steps described. For example, the computing device 122 may orchestrate SIM provisioning based on a location pattern, a quantity of time, data consumption, or combinations thereof according to the user device 102. The computing device 122 may be configured to send a request to the user device 102 to determine whether the user device 102 is interested in connecting over the MSO network with eSIM credentials. The computing device 122 may be or may be connected with a remote SIM provisioning system (SM-DP+). The user device 102 may connect with the computing device 122, through the computing device 122, or according to the computing device 122 to obtain the eSIM or eUICC.

The computing device 122 may be associated with either the network 210 or the network 240. The computing device 122 may be independent of the network 210 and the network 240. For example, the computing device 122 may serve as an intermediary, receiving data from the user device 102 over either of the networks 210, 240 or another network and providing a provisioning of the identifier and key. The identifier and the key may be pushed or pulled.

The computing device 122 may include instructions to serve as a proxy or proxy server (e.g., an MPTCP proxy) for the plurality of paths formed between application servers 270, 280 and user device 102. For example, one or more application servers 270, 280 may be configured to send and receive communications with the computing device 122 based on communications from the user device 102 over one or more paths associated with networks 210, 240.

Figure 3:
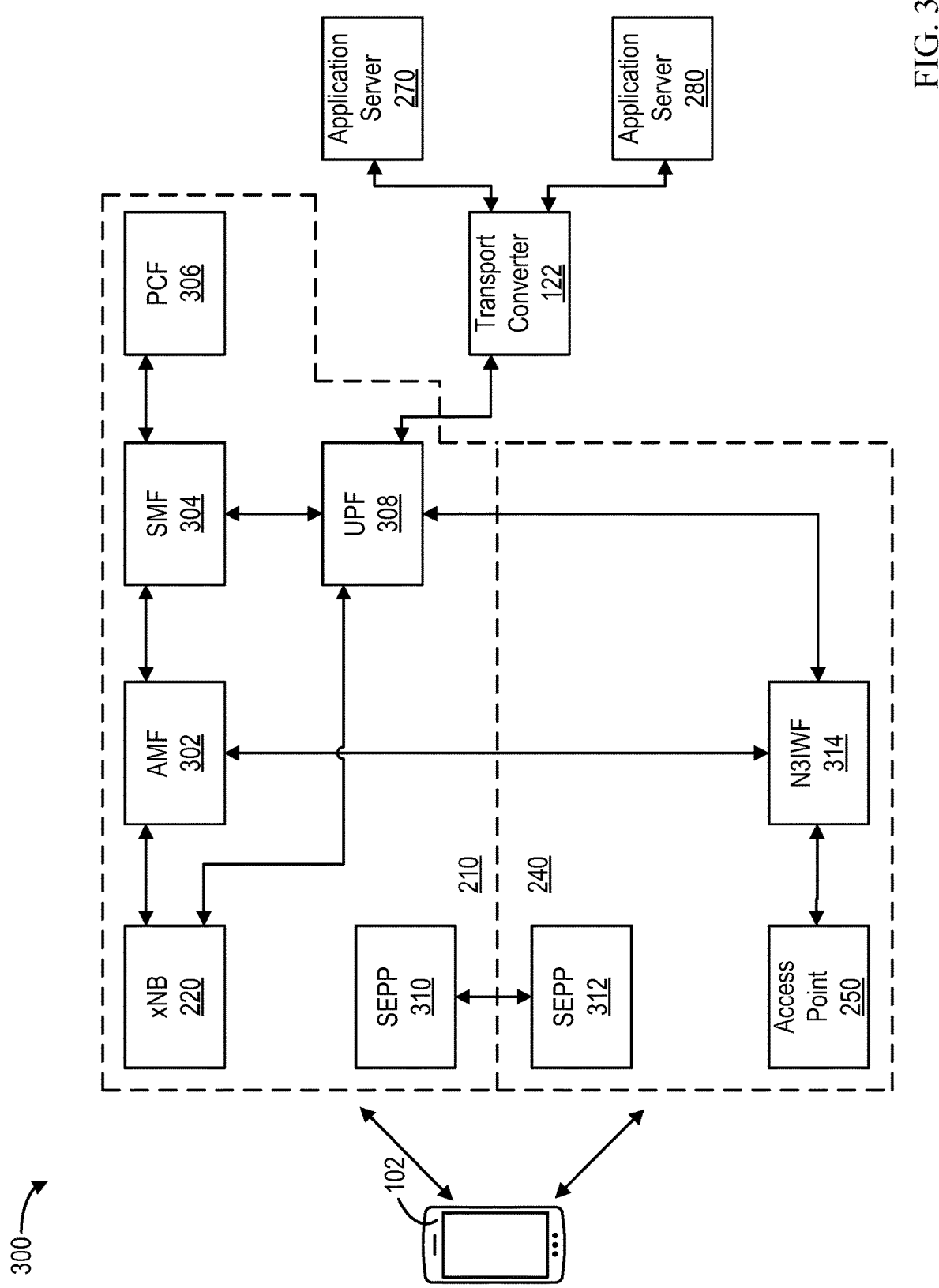
FIG. 3 illustrates an example communication architecture having an interworking function in accordance with one or more implementations of the present disclosure.

In FIG. 3, an example architecture 300 with an interworking function 314 in accordance with one or more implementations of the present disclosure is shown. The interworking function 314 may be connected with the user plane function 308 of network 240. The interworking function 314 may be associated with one or more of networks 210, 240. The interworking function 314 may provide the user device 102 access to the computing device 122. The user plane functions 308 may be connected over an N9 interface. The N9 interface may be encapsulated by the connection provided by SEPP 310, 312. The policy control function 306 may be configured to communicate with the computing device 122 over an N6 interface while each user plane function is individually connected with the computing device 122 over respective interfaces. These interfaces may be an N6 interface, an Nx interface, or another applicable interface. As an example, the computing device 122 may be part of a data network associated with a PLMN (e.g., network 210, 240). The data network may be separate from a voice network associated with either of the networks 210, 240. The computing device 122 may be part of a network independent from either of the networks 210, 240 and hosted by a third party. As an example, the computing device 122 may be provisioned on a cloud-computing server accessible over the Internet.

The access and mobility management function 302 is the entry function of the control plane and may connect to the core network. The access and mobility management function 302 may terminate the non-access stratum (NAS) of the user device 102. The access and mobility management function 302 may also perform access authentication for the user device 102 and mobility management. Additionally, the access and mobility management function 302 may route session management messages to the one or more session management functions 304.

The session management function 304 may be responsible for termination of session based on the session management function from the user device 102. The session management function 304 may allocate Internet Protocol addresses and provide control of the user plane function 308 (UPF). The session management function 304 may also terminate sessions associated with the policy control function 306 (PCF). The session management function 304 may communicate with the access and mobility management function 302 over the N11 interface and the policy control function 254 over the N7 interface.

The policy control function 306 may enable policy rules described herein and enable control functions for enforcement. These rules may be distributed and enforced at the user device 102 or other functions described herein. As an example, the policy control function 306 may enable route and slice selection.

The user plane function 308 may implement the packet forwarding and routing for user plane data in the role of the inter-radio access technology (RAT) and intra-RAT anchor. The user plane function 308 may also provide IP address allocation when instructed by the session management function 304 and can provide gating or downlink data buffering. The user plane function 308 may communicate with the session management function 304 over the N4 interface. The user plane function 308 may communicate with the data network associated with the application servers 270, 280 over an N6 interface. The application servers 270, 280 may be part of either network 210, 240 or available on the Internet or other data networks not associated with the network 210, 240.

In some circumstances, the interworking function 314 or other functions may be configured to authenticate with the network 210. For instance, user device 102 may include a credential circuit comprising authentication credentials for network 210. The user device 102 may include a credential circuit comprising authentication credentials (e.g., identifiers, keys) for network 240. The authentication credentials may provide cross-validation and access to either network 210, 240. For instance, the authentication credentials may be associated with network 240 and traverse the interworking function 314, providing access to network 240 from the user device 102. The same authentication credentials may indicate access, from network 240 to network 210. An indication may be provided from the network 240 to network 210 indicating that access is authorized without provided credentials specific to network 210. In such a way, access to network 210 may be achieved with authentication credentials for network 240 or vice versa. As an example in combination or separate, the authentication credentials may be based on an eSIM or embedded SIM associated with the user device 102. The authentication credentials may be issued by the network 240 associated with the interworking function 314. The authentication credentials may provide access to the network of the network 210.

The example architecture 300 may include an interworking function 314. The interworking function 314 may be a non-3GPP interworking function (N3IWF). The interworking function 314 may be associated with an access point 250 of one of the networks (e.g. network 240). Also shown is an interworking function 314 that may be associated with an access point 250 of the other of the networks (e.g., network 210). The interworking function 314 may provide access to 3GPP functions from a non-3GPP access point. As an example, the access point 250 may be configured to communicate over IEEE 802.11 or other protocols. For example, the access point 250 may be one or more hotspots associated with a public, corporate, or otherwise access network. The interworking function 314 may allow PDU session establishment and user plane functionalities (e.g., quality of service). In such away, the user device 102 may be configured to connect to a network having 3GPP functions (e.g., packet-switched gateways, user plane functions). For example, the interworking function 314 may provide user device 102 access to user plane function 308. As an example, the interworking function 314 may determine corresponding commands or instructions based on communications from the user device 102 sent over the access point 250 for translation to the user plane function 308.

As shown, the example architecture 300 may include respective networks 210, 240 having respective security edge protection proxies (SEPP) 310, 312. The SEPPs 310, 312 may provide for a path for signaling traffic across network. The communication between SEPPs 310, 312 may be authenticated and constituting all or part of an N32 interface. As an example, the user plane functions 308 may establish communications over an N9 interface. The N9 interface may be encapsulated by the SEPPs 310, 312 and sent over the N32 interface between the two networks 210, 240. Although shown as direct communication channels, all inter-PLMN communications may be transmitted through the N32 interface.

Figure 4:
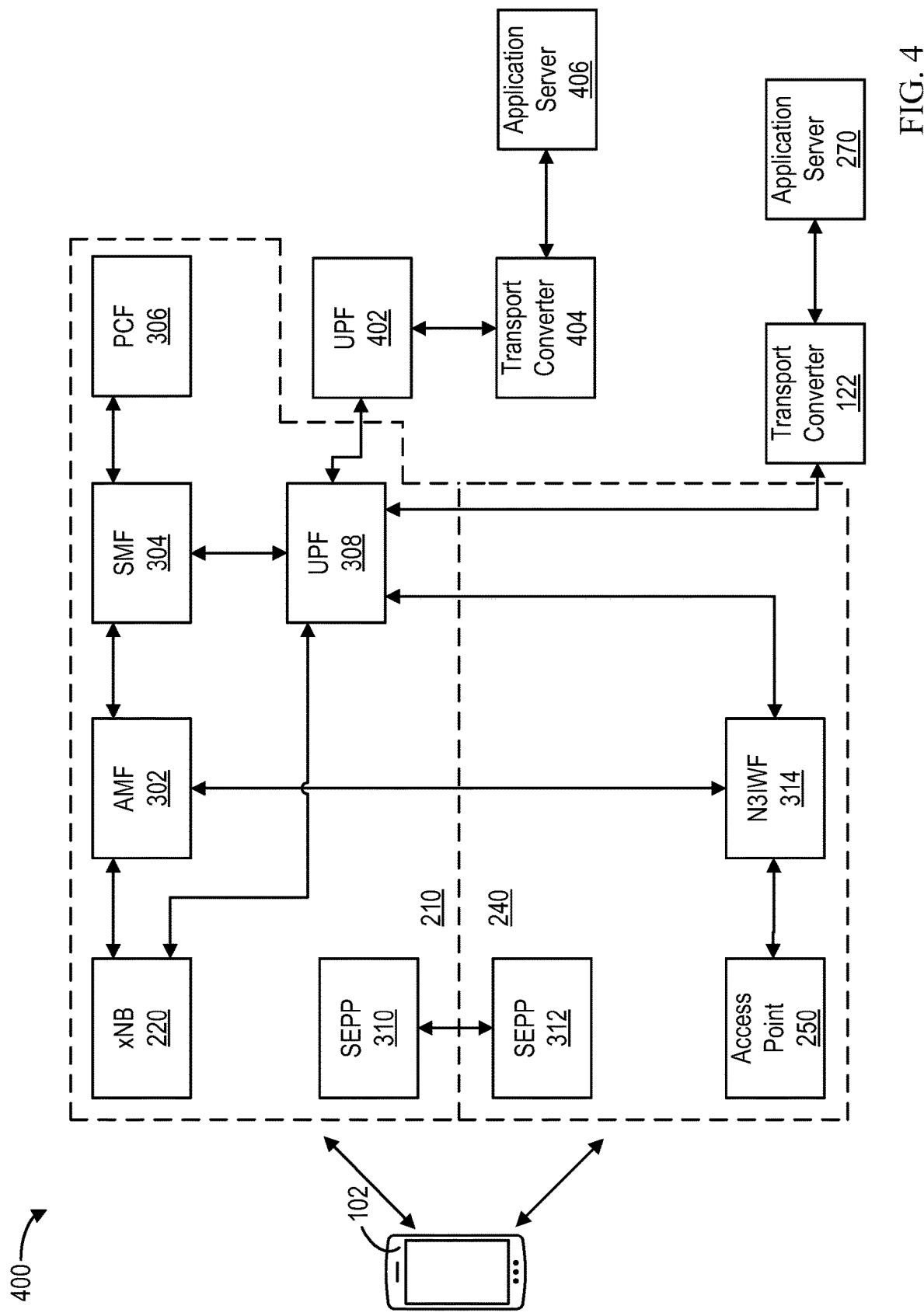
FIG. 4 illustrates an example communication architecture in accordance with one or more implementations of the present disclosure.

In FIG. 4, an example communication architecture 400 in accordance with one or more implementations of the present disclosure is shown. The architecture 400 includes the computing device 122, which may include instructions for the transport converter, on the edge of the network 210. For example, a rule may exist to direct traffic and data requiring low-latency to a one-hop or less than five hop distance from the user plane function 308. The rule may also be based on network conditions or network parameters. The transport converter may be located on the same network as network 210 or network 240 or a network that is operated by an operator of network 210 or network 240. A rule may exist to further direct traffic to another user plane function 402 and transport converter 404 that is located on a public cloud. The transport converter may be configured to communicate with another application server 406. The application server 406 may be on a public or private network.

Figure 5:
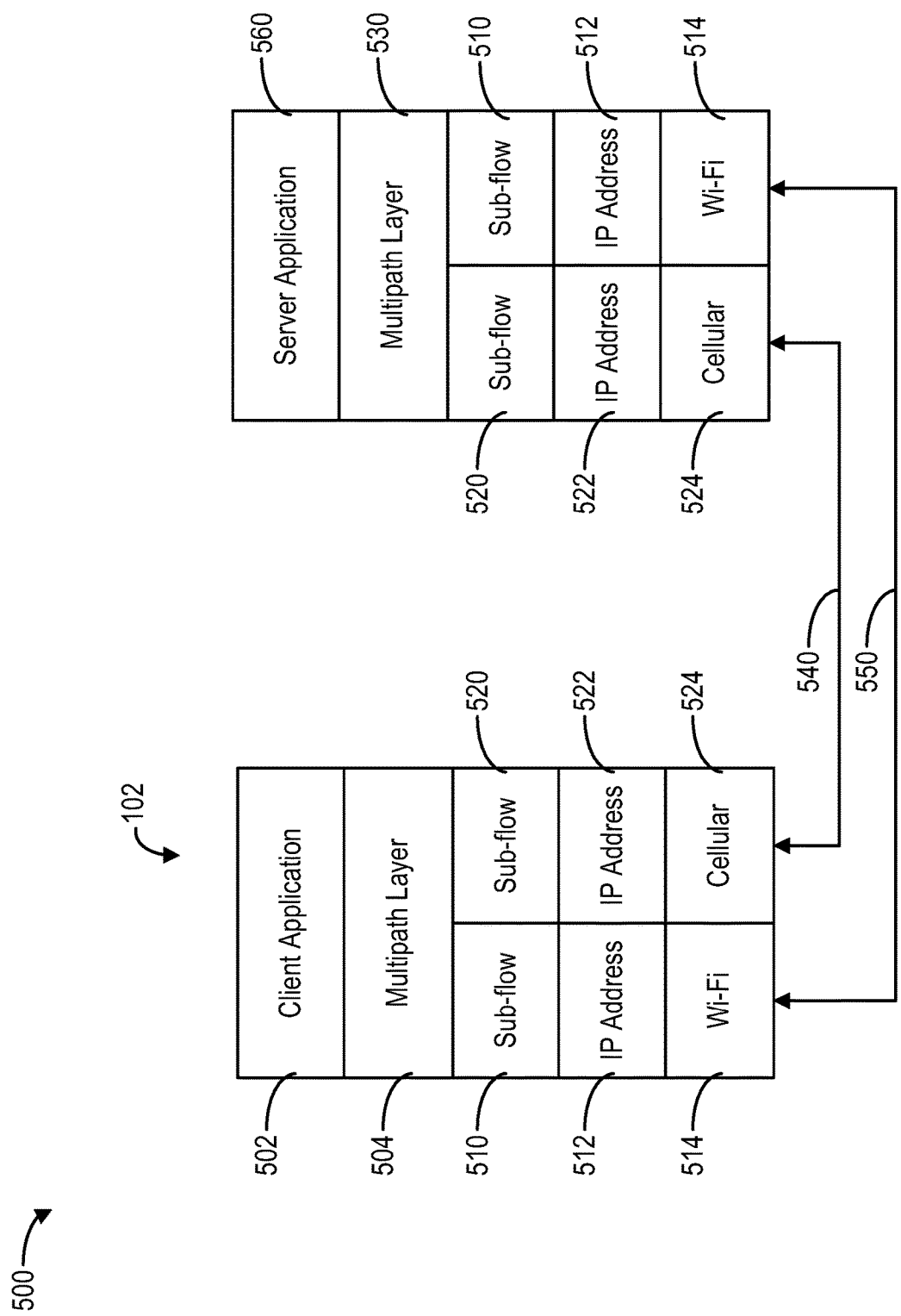
FIG. 5 illustrates an example protocol stack in accordance with one or more implementations of the present disclosure.

In FIG. 5, an example protocol stack 500 in accordance with one or more implementations of the present disclosure is shown. The protocol stack 500 includes a client application 502. The client application 502 may be a set of instructions that the user device 102 is operable to execute. The client application 502 may be executed on a user layer as opposed to a kernel layer of an operating system of the user device 102. The layer may be indicated by allocated memory for consumption by applications available to the user. The client application 502 may be configured to generate packet-based communications. The user device 102 may be configured to receive those packet-based communications and convert them to multipath communications with the multipath layer 504. The multipath layer 504 may create two subflows 510, 520. The subflows 510, 520 may be respectively assigned IP addresses 512, 522 according to respective communication mediums 514, 524. The data may traverse over more than one path 540, 550 to the receiving side with similar layers to that of the user device 102. A multipath layer 530 may convert (e.g., a transport converter) the received multipath communications into a single path for the server application 560 that does not support multipath communications. The server application 560 may be executed on a user layer as opposed to a kernel layer of an operating system of the application server (e.g., application server 270). The transport converter may be based on a 0-RTT protocol (e.g., Internet Engineering Task Force (IETF) request for comment (RFC) 8803).

Figure 6:
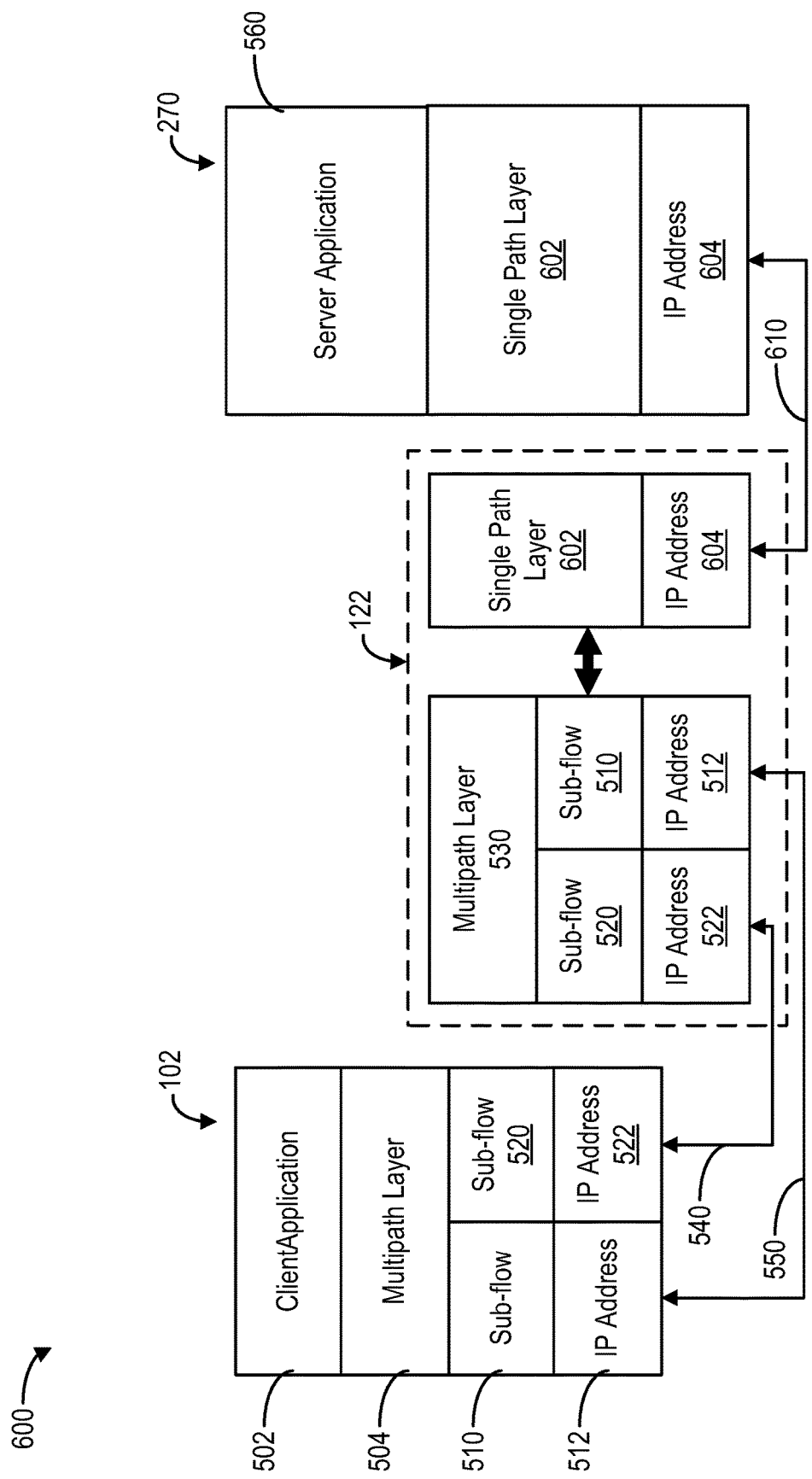
FIG. 6 illustrates an example communication link in accordance with one or more implementations of the present disclosure.

In FIG. 6, an example communication link 600 in accordance with one or more implementations of the present disclosure is shown. The communication link 600 may include one or more nodes (e.g., xNB 220, gateway 260) associated with one or more networks 210, 240. The user device 102 includes instructions for executing a client application 502. The user device 102 may further include instructions for a multipath connection. A multipath connection may be based on multipath Transmission Control Protocol (MPTCP), multipath QUIC (MPQUIC), multipath Datagram Congestion Control Protocol (MPDCCP), another multipath protocol, or a combination thereof. An identifier may be assigned to designate the multipath connection. The multipath connection may include two subflows 510, 520 and be based on multipath layer 504 and multipath layer 530. The subflows 510, 520 may be identified based on a subflow sequence number. For example, the sequence numbers may be used to reassemble data sent over the multipath connection. For example, a data sequence mapping may be used to assemble data received over the path and data received over the path. The path 540 may comprise nodes or hops from network 210 (e.g., xNB 220, UPF 214) and the path 550 may comprise nodes or hops from network 240. Each subflow may have an individual IP address 512, 522. The paths may also include nodes or hops that are associated with the same network or intermingled.

The data may be assembled based on a data sequence mapping or map. The data sequence map may be based on a first subflow sequence number and a second subflow sequence number associated with each path, respectively. As such, the combination of the data from the path of the first network and the data of the path of the second network may be combined based on the data sequence mapping to establish ordered data without a loss of integrity. The response may be disassembled into portions and retransmitted over the respective paths to improve throughput and speed in a similar fashion.

The multipath connection may terminate at a computing device 122. The computing device 122 may include instructions to perform transport conversion by a transport converter. The transport converter may be based on a 0-RTT protocol (e.g., Internet Engineering Task Force (IETF) request for comment (RFC) 8803). The transport converter may be configured to convert the multipath connection into a single path connection according to single path layer 602. In such a way, the transport converter may serve as a proxy between the user device 102 and the application server 270 and provide communications over multiple paths and subflows 510, 520. The single path 610 may terminate at a server application 560.

Figure 7:
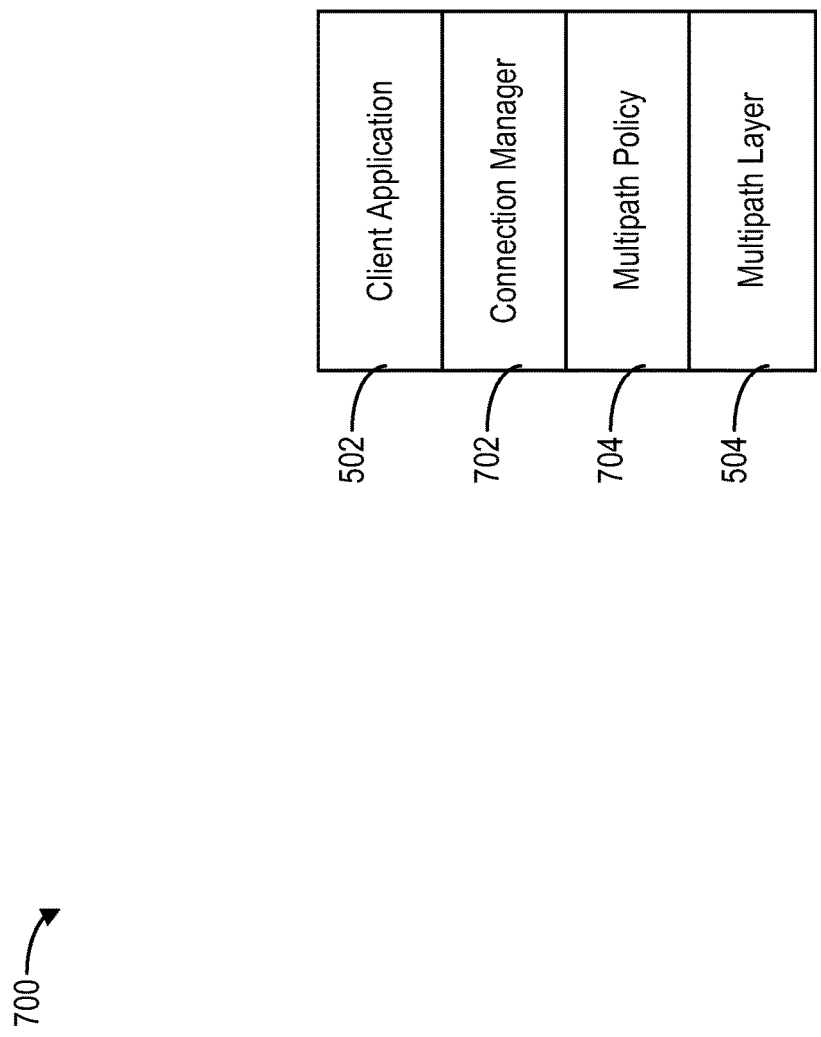
FIG. 7 illustrates an example control framework in accordance with one or more implementations of the present disclosure.

In FIG. 7, an example control framework 700 in accordance with one or more implementations of the present disclosure is shown. The framework may include the client application 502 associated with a connection manager 702. The connection manager 702 may include steering policies 704 (e.g., Access Traffic Steering, Switching & Splitting (ATSSS)) for connecting and disconnecting from a multipath communications. For example, the connection manager may include a policy 704 that comprises rules related to the access point 250 or xNB 220 of the networks 210, 240. The connection manager may then control the multipath layer 504 and other elements of the Open Systems Interconnection (OSI) stack.

In FIG. 8, an example policy 800 in accordance with one or more implementations of the present disclosure is shown. The policy 800 may be defined in various formats. For example, the policy 800 may be defined as dictionary or an array. The policy 800 may include one or more rules 802, 804, 806, 808. Rule 802, for example, may define a steering mode. For example, the steering mode may be active-standby, smallest delay, load balancing, priority based, otherwise, or a combination thereof. The steering mode may steer traffic to the path with the highest throughput.

Rule 804 may be associated with an autonomous load-balance operation or assistance from the user device 102 according to rule 802 having set the mode to load balancing. Rule 806 may define a threshold for parameters (e.g., time for a round trip, ratio or rate of packets lost, throughput, other pathway analytics) associated with the each of the subflows 510, 520. Other rules may be included in the policy 800, as shown. The policy may be stored on the user device 102 or the computing device 122.

The policy 800 may further include a rule that describes or is indicative of a predetermined throughput for one or more of the subflows 510, 520 or paths. For example, a network operator may survey the network based on different access points, nodes, and endpoints to predict the throughput of particular paths at a given time. The results of the survey may be communicated the user device 102 or the computing device 122 and those devices may use these predetermined throughputs for initiating access or continuous use. For example, the device may use the predetermined throughputs until a transient determination is made regarding the actual throughput of the path using teachings described herein. The policy may contain a preference for one or more of the paths based on previous parameters and constraints of those paths. The preference may be defined as a rule in the policy 800. Particular network architectures may be predisposed to higher throughput. For example, a network (e.g., network 240) may include a wireless access point with higher throughput than another network (e.g., network 210). The preference may be used as a rule to ensure communications are initiated on a specific network.

The parameters may be prescribed in a standard or other matter. For example, the construction of a packet configured to determine a round trip time may be defined according to a function (e.g., performance measurement function (PMF) protocol (PMFP)). For example, the packet may include an identifier indicative of a transaction. The identifier may be an Extended Procedure Transaction Identity (EPTI). Further, the packet may be padded based on a requested length according to other OSI layers.

Figure 9:
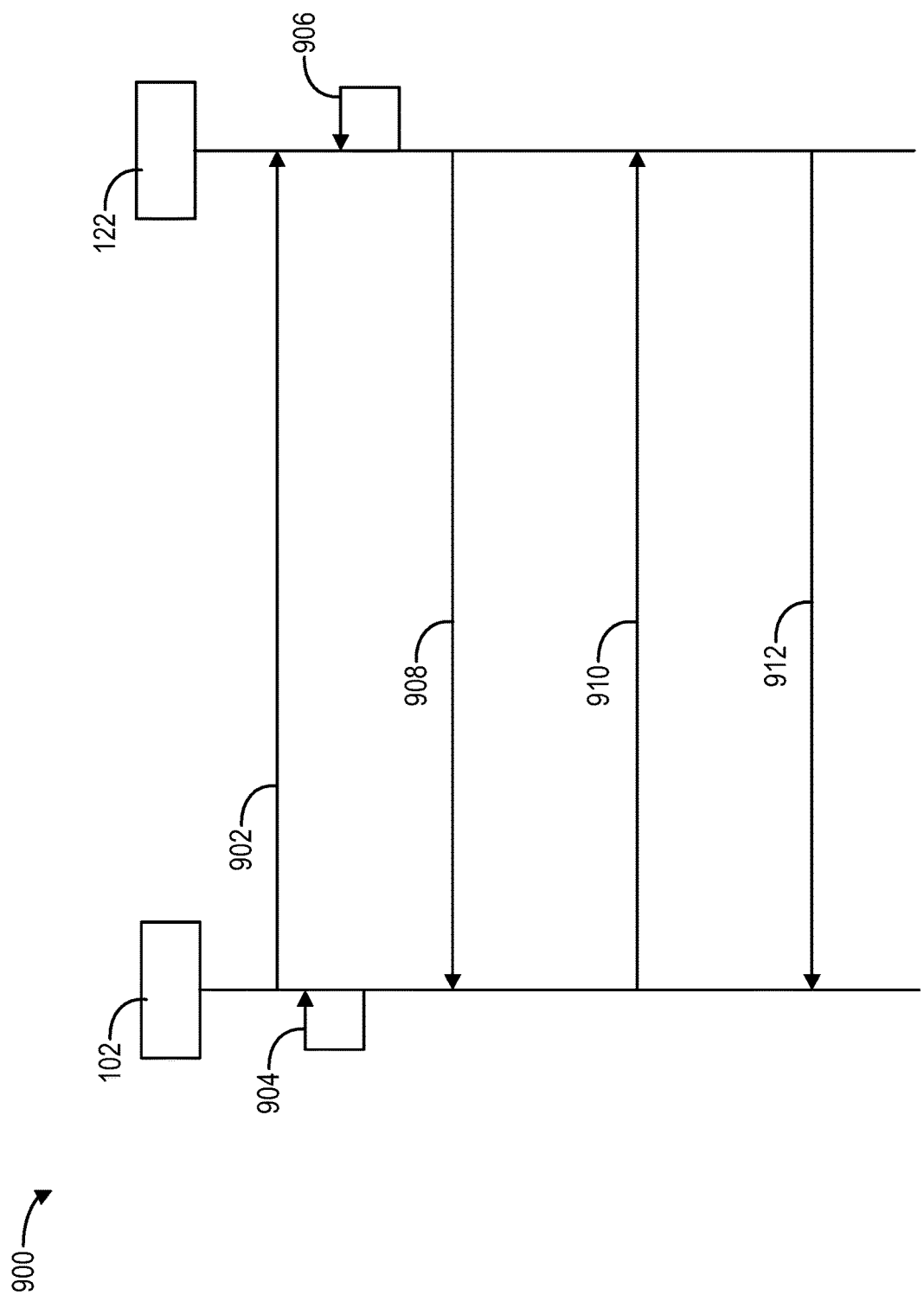
FIG. 9 illustrates an example method in accordance with one or more implementations of the present disclosure.

In FIG. 9, an example method 900 in accordance with one or more implementations of the present disclosure is shown. The method 900 may be performed by any of the devices or nodes discussed herein and combinations thereof. For example, the method 900 may be performed by the user device 102, the application server 270, the computing device 122, other nodes, and combinations thereof. The method may be implement to determine a throughput of one or more paths of the connection. For example, a device (e.g., user device 102) may begin by sending a request to count packets in step 902. The request may initiate a timer (e.g., T1ab, T2xy) or timing component on the computing device 122. For example, the computing device 122 may determine a timestamp when the packet is received. The packet may be an information element (IE) or another construction. For example, the packet may be configured for providing the duration of a round trip or a ratio or rate of packet loss. The device (e.g., user device 102) may continue sending the same packet (e.g., multiple packets with the same format, data, or combinations thereof) or a different pack (e.g., a bulk data payload) to the computing device 122 in step 904. The quantity of packets or payloads may be increased over time to assist in determining the throughput of the path. The computing device 122 may determine the quantity of bits or bytes received over a duration or period of time (e.g., bytes per second) in step 906. The quantity of packets or payload may be set to a predetermined link capacity associated with the path or subflow 510, 520. The link capacity may be specified in policy 800. Step 902 may include allocating an EPTI value. Step 902 may also include creating a count request. Step 902 may include setting the EPTI IE of the PMFP throughput count request to the allocated EPTI value. Step 902 may include sending the count request to the device (e.g., computing device 122). Sending the count request to the device may be based on a quality of service flow indicated in measurement assistance information (MAI) according to the path.

The determination may be based on the timestamp and the packets received since the timestamp was taken. The computing device 122 may provide the determined throughput to the user device 102 in bytes per second or another format in step 908. The response may be provided in step 908 based on each packet received, quantity of bits or bytes received, otherwise, or a combination thereof. The process or transaction may be requested to end based on a request from the device (e.g., user device 102). For example, the user device 102 may request a report from the computing device 122 in step 910. The request for report may include an accounting request (ACR) bit being set if there are additional requests planned or predicted. The computing device 122 or user device 102 may cancel the count request after a predetermined duration (e.g., timeout duration). In step 912, the computing device 122 may provide an indication the total bits or bytes received since the receipt of the initial request in step 902. The report may include an indication of bits or bytes received over time binned according to reset requests.

Figure 10:
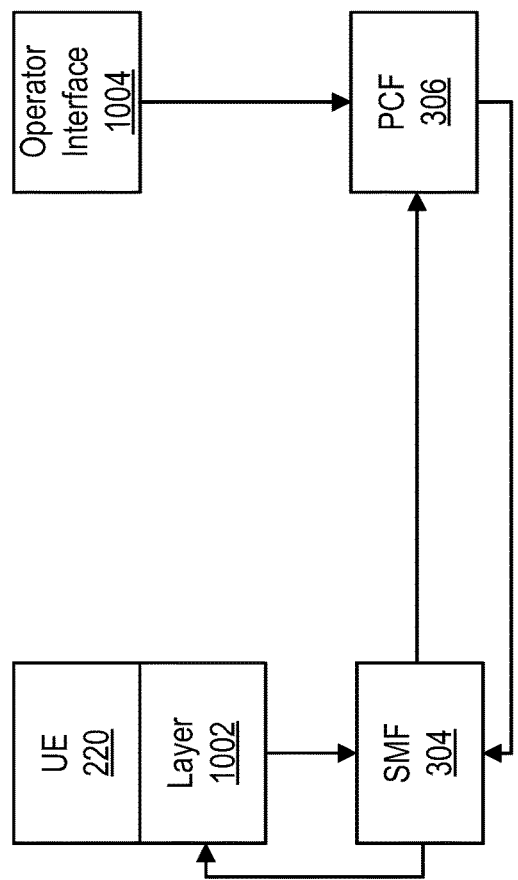
FIG. 10 illustrates example communications architecture in accordance with one or more implementations of the present disclosure.

In FIG. 10, an example communications architecture 1000 in accordance with one or more implementations of the present disclosure is shown. The user device 102 may include a layer 1002 (e.g., non-access stratum (NAS) layer, network layer, layer 504, or otherwise) configured to communicate with the session management function 304. The session management function 304 may provide an indication of multipath applicability to the layer 1002. The layer 1002 may provide an indication of multipath capability to the session management function 304. The session management function 304 may provide such an indication to the policy control function 306 and the policy control function 306 may provide a multipath indication to the session management function. The policy control function 306 may receive the policy 800 and distribute the policy 800 to the user device 102 and the session management function 304. An operator interface 1004 may allow adjustments of the policy 800. The operator interface 1004 may be an application programming interface (API). The operator interface 1004 may include instructions for distributing the policy 800 to more than one policy and charging functions associated with the network (e.g., network 210).

Figure 11:
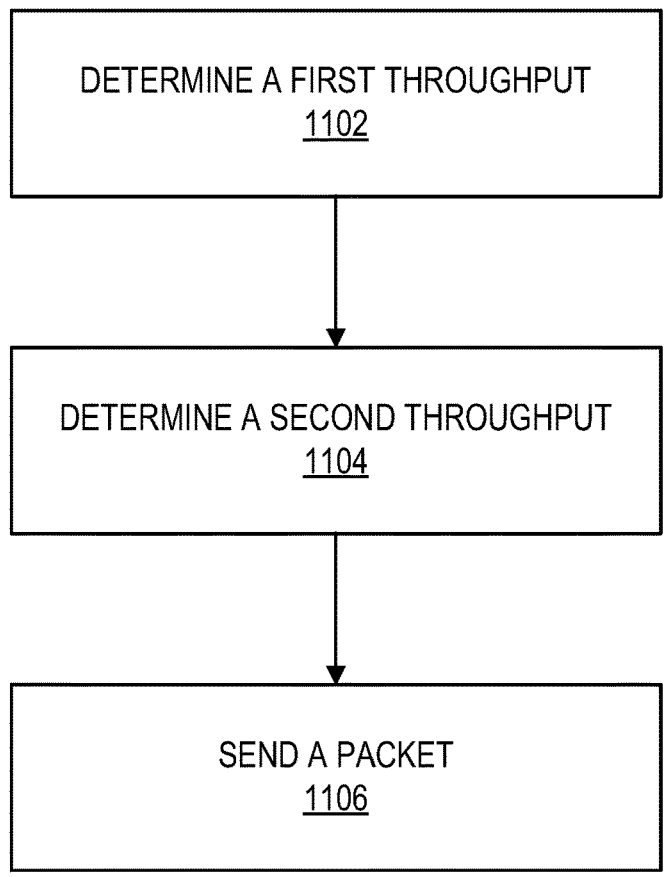
FIG. 11 illustrates an example method in accordance with one or more implementations of the present disclosure.

In FIG. 11, an example method 1100 in accordance with one or more implementations of the present disclosure is shown. The method 1100 may be performed by any of the devices or nodes discussed herein and combinations thereof. For example, the method 1100 may be performed by the user device 102, the application server 270, the computing device 122, other nodes, and combinations thereof. In step 1102, a first throughput is determined. The throughput may be based on a path (e.g., a path based on subflow 510). The throughput may be based on a connection associated with the path. For example, the connection may be defined by a connection identifier or unique identifier. The throughput may be based on a mode selection. For example, the mode selection may be provided in a policy (e.g., policy 800). The mode selection may be defined by the operator interface 1004 or another interface or device. The mode selection may be define in a rule of the policy (e.g., rule 802).

Throughput may be based on other parameters, constraints, policies, or components relevant to the path. For example, the throughput may be based on a packet. The packet may be an IE. The packet may be configured to determine a throughput, a duration of a round trip, a ratio or quantity of packets lost over the path, other types of packets (e.g., Internet Control Message Protocol (ICMP) packets), or a combination thereof.

For example, throughput may be based on a packet configured to determine the duration of a round trip over the path. The user device 102 or another computing device 122 may include instructions to send the specialized packet to determine the duration of a round trip time. The throughput may be based on this packet or a similar packet without requiring retransmission or duplication. For example, the request sent, in step 902 or another step, may indicate that the device should count the round trip packet as part of the throughput calculation.

Throughput may be determined based on a packet having a user data payload. For example, the packet may include content or content items, webpage requests, a uniform resource locator (URL). For example, the user device 102 may be streaming video from application server 270. The request, in step 902 or another step, may be sent to the application server 270 or computing device 122. Based on the user data, the throughput may be calculated similar to the steps described in FIG. 9.

When more than one path or subflow e.g., (subflow 510, 520) exists, the device (e.g., user device 102) may test the throughput of paths or subflows that are idle. For example, the device (e.g., user device 102) may determine which of the paths of the connection have traffic that is indicative of idleness according to a threshold. The threshold may include negligible or typical heartbeat or watchdog signals. For example, the threshold may ensure that throughput is determined for paths that have bits transmitted over a duration or accumulation of bits over a duration that are less than the threshold or are otherwise idle.

Throughput may be based on a packet configured to determine a ratio of packets lost or rate of packets lost over the path. The user device 102 or another computing device 122 may include instructions to send the specialized packet to determine the duration of the ratio of packets lost or the rate of packets lost over the path. The throughput may be based on this packet or a similar packet without requiring retransmission or duplication. For example, the request sent, in step 902 or another step, may indicate that the device should count the packet as part of the throughput calculation.

An identifier may be used to identify the method 900 for one or more paths. For example, the method 900 may be preceded by an identifier being initiated. The identifier may be an Extended Procedure Transaction Identity (EPTI).

In step 1104, a second throughput is determined. The throughput may be based on a path (e.g., a path based on subflow 520). The throughput may be based on a connection associated with the path. For example, the connection may be defined by a connection identifier or unique identifier. The throughput may be based on a mode selection. For example, the mode selection may be provided in a policy (e.g., policy 800). The mode selection may be defined by the operator interface 1004 or another interface or device. The mode selection may be define in a rule of the policy (e.g., rule 802). The mode selection may indicate that throughput is required to be used for traffic steering.

Throughput may be based on other parameters, constraints, policies, or components relevant to the path. For example, the throughput may be based on a packet. The packet may be an IE. The packet may be configured to determine a throughput, a duration of a round trip, a ratio or quantity of packets lost over the path, other types of packets (e.g., Internet Control Message Protocol (ICMP) packets), or a combination thereof.

For example, throughput may be based on a packet configured to determine the duration of a round trip over the path. The user device 102 or another computing device 122 may include instructions to send the specialized packet to determine the duration of a round trip time. The throughput may be based on this packet or a similar packet without requiring retransmission or duplication. For example, the request sent, in step 902 or another step, may indicate that the device should count the round trip packet as part of the throughput calculation.

Throughput may be determined based on a packet having a user data payload. For example, the packet may include content or content items, webpage requests, a uniform resource locator (URL). For example, the user device 102 may be streaming video from application server 270. The request, in step 902 or another step, may be sent to the application server 270 or computing device 122. Based on the user data, the throughput may be calculated similar to the steps described in FIG. 9.

When more than one path or subflow e.g., (subflow 510, 520) exists, the device (e.g., user device 102) may test the throughput of paths or subflows that are idle. For example, the device (e.g., user device 102) may determine which of the paths of the connection have traffic that is indicative of idleness according to a threshold. The threshold may include negligible or typical heartbeat or watchdog signals. For example, the threshold may ensure that throughput is determined for paths that have bits transmitted over a duration that are less than the threshold or are otherwise idle.

Throughput may be based on a packet configured to determine a ratio of packets lost or rate of packets lost over the path. The user device 102 or another computing device 122 may include instructions to send the specialized packet to determine the duration of the ratio of packets lost or the rate of packets lost over the path. The throughput may be based on this packet or a similar packet without requiring retransmission or duplication. For example, the request sent, in step 902 or another step, may indicate that the device should count the packet as part of the throughput calculation. The second throughput may be based on the same identifier used to identify the method 900 for the other of the paths.

The first throughput may be based on a packet configured to determine a parameter of the first path. The second throughput may be based on the same parameter or a different one of the parameters. For example, the packet for the first throughput may be the duration of the round trip and the packet for the second throughput may be the ratio of packets lost according to the second path.

In step 1106 a packet is sent. The packet may include data from an application. The application may be a user application or an application of an unelevated user. For example, the user application may allow streaming of video or other content. The application may be executed on the user device 102. The packet may be sent based on a magnitude of the first throughput and a magnitude of the second throughput. For example, the packet may be sent over the first path when a magnitude of the first throughput is greater than the magnitude of the second path.

Instructions may be used to determine which path should be used when data is sent or received. The uplink path from the user device 102 may be different from the downlink path of the user device 102. For example, an uplink throughput for the first path may be greater than an uplink path for the second path and the downlink throughput for the second path may be greater than the downlink path for the second path.

The path selected may be further based on gating or permissives related to the other parameters. A rule may be used to promulgate the gating or permissives. For example, a path may be required to satisfy a threshold in order to be a candidate for selection based on a rule in the policy 800. For instance, the duration of round trip for a path may be required to be less than the threshold in order for the path to be selected based on the throughput. The ratio of lost packets may also be required to satisfy a threshold in order for the path to be selected based on the throughput.

The uplink or downlink throughput may be limited based on a subscription. The subscription may be characterized in rules of the policy 800. For example, a preference may indicated in the policy 800 because of a specific subscription rate. If the subscription prevents throughput greater than a threshold, a throughput on a path that exceeds the subscription amount may allow determination of the throughput to be assumed based on the subscription amount, and the path exceeding the subscription amount to be selected.

The uplink or downlink throughput may be limited based on a topological constraint, hardware constraint, network constraint, architectural constraint, otherwise, or a combination thereof. The constraint may be characterized in rules of the policy 800. For example, a preference may indicated in the policy 800 because of a specific constraint. If the constraint prevents throughput greater than a threshold, a throughput on a path that exceeds the constraint amount may allow determination of the throughput to be assumed based on the constraint amount, and the path exceeding the constraint amount to be selected.

The network functions described herein may be generally referred to as a generic combination function that may run on one or more servers, one or more instances, one or more sets of instructions, and so on. Such instances may be containerized, replicated, scaled, and distributed by network 210, 240 to meet the growing demands of respective networks. Any of the steps or functions described in one or more of the methods, architectures, or call flows described herein may be used in conjunction with any of the other methods, architectures, or call flows described herein. Any of the components (e.g., network functions, user equipment, servers) may perform any of the steps from any of the methods or call flows described herein even though not specifically described and may be performed in combination with any of the other components. It should be appreciated that the techniques described herein relate to various protocols and technology and may at least apply to 3G, LTE, and 5G technologies.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    determining a first throughput based on monitoring a first packet over a first path of a connection, the first packet configured to determine a parameter of the first path, wherein the first path comprises a mode selection and an identifier of the connection;
    determining a second throughput based on monitoring a second packet over a second path of the connection, the second packet configured to determine a parameter of the second path, wherein the second path comprises the mode selection and the identifier of the connection; and
    sending a third packet comprising data of an application, wherein the third packet is based on the first throughput and the second throughput.

2. The method of claim 1, wherein the determination of the first throughput is further according to steps comprising:
    sending the first packet; and
    receiving, based on a timestamp of receipt of the first packet, an indication of bits received according to the first path.

3. The method of claim 1, wherein the first throughput is further determined based on the first path having an accumulation of bits according to a duration satisfying a threshold.

4. The method of claim 3, wherein the accumulation of bits according to the duration satisfying the threshold indicates the first path is idle.

5. The method of claim 1, wherein the parameter of the first path is a first duration of a round trip according to the first path and the parameter of the second path is a second duration of a round trip according to the second path.

6. The method of claim 1, wherein the parameter of the first path is a first ratio of packets lost according to the first path and the parameter of the second path is a second ratio of packets lost according to the second path.

7. The method of claim 1 further comprising:
    initiating an identifier indicative of a transaction.

8. The method of claim 7, wherein the identifier indicative of the transaction is an Extended Procedure Transaction Identity (EPTI).

9. The method of claim 7, wherein the first throughput is determined based on the identifier indicative of the transaction and the second throughput is determined based on the identifier indicative of the transaction.

10. The method of claim 1, wherein a magnitude of the first throughput is greater than a magnitude of the second throughput and the sending the third packet is according to the first path.

11. The method of claim 1, wherein the sending the third packet is further based on the parameter of the first path and the parameter of the second path.

12. The method of claim 11, wherein the parameter of the first path satisfies a threshold.

13. The method of claim 1, further comprising: sending a policy containing a rule, wherein the sending the third packet is further based on the rule and the rule is indicative of the first throughput and the second throughput.

14. The method of claim 1, further comprising: receiving a policy containing a rule, wherein the sending the third packet is further based on the rule and the rule is indicative of the first throughput and the second throughput.

15. The method of claim 1, further comprising selecting, based on the first throughput and the second throughput, the first path or the second path.

16. The method of claim 1, further comprising: sending, based on a preference for the first path, a fourth packet according to the first path, wherein the fourth packet is sent before the third packet.

17. The method of claim 16, wherein the first path comprises a wireless access point and the preference is based on the first path comprising the wireless access point.

18. A method comprising:
    determining a first throughput based on monitoring a first packet over a first path of a connection, the first packet configured to determine a parameter of the first path, wherein the first path comprises an identifier of the connection;
    determining a second throughput based on monitoring a second packet over a second path of the connection, the second packet configured to determine a parameter of the second path, wherein the second path comprises a mode selection and the identifier of the connection;
    selecting the first path or the second path, wherein the first path or the second path is selected based on the first throughput and the second throughput; and
    sending a third packet comprising data of an application, wherein the third packet is based on the first throughput and the second throughput.

19. The method of claim 18, wherein the determination of the first throughput is further according to steps comprising:
    sending the first packet; and receiving, based on a timestamp of receipt of the first packet, an indication of bits received according to the first path.

20. The method of claim 18, wherein the first throughput is further determined based on the first path having an accumulation of bits according to a duration satisfying a threshold.

21. The method of claim 20, wherein the accumulation of bits according to the duration satisfying the threshold indicates the first path is idle.

22. The method of claim 18, wherein the parameter of the first path is a first duration of a round trip according to the first path and the parameter of the second path is a second duration of a round trip according to the second path.

23. The method of claim 18, wherein the parameter of the first path is a first ratio of packets lost according to the first path and the parameter of the second path is a second ratio of packets lost according to the second path.

24. The method of claim 18 further comprising:
initiating an identifier indicative of a transaction.

25. The method of claim 24, wherein the identifier indicative of the transaction is an Extended Procedure Transaction Identity (EPTI).

26. The method of claim 24, wherein the first throughput is determined based on the identifier indicative of the transaction and the second throughput is determined based on the identifier indicative of the transaction.

27. The method of claim 18, wherein a magnitude of the first throughput is greater than a magnitude of the second throughput and the sending the third packet is according to the first path.

28. The method of claim 18, wherein the sending the third packet is further based on the parameter of the first path and the parameter of the second path.

29. The method of claim 28, wherein the parameter of the first path satisfies a threshold.

30. The method of claim 18, further comprising: sending a policy containing a rule, wherein the sending the third packet is further based on the rule and the rule is indicative of the first throughput and the second throughput.

31. The method of claim 18, further comprising: sending, based on a preference for the first path, a fourth packet according to the first path, wherein the fourth packet is sent before the third packet.

32. The method of claim 31, wherein the first path comprises a wireless access point and the preference is based on the first path comprising the wireless access point.

33. A method comprising:
receiving a policy comprising a rule;
sending a first data packet comprising data of an application, wherein the first data packet is sent based on the rule;
determining a first throughput based on monitoring a first packet over a first path of a connection, the first packet configured to determine a parameter of the first path, wherein the first path comprises a mode selection and an identifier of the connection;
determining a second throughput based on monitoring a second packet over a second path of the connection, the second packet configured to determine a parameter of the second path, wherein the second path comprises the mode selection and the identifier of the connection; and
sending a third packet comprising data of the application, wherein the third packet is based on the first throughput and the second throughput.

34. The method of claim 33, wherein the rule is indicative of the second throughput according to the second path.

35. The method of claim 33, further comprising: sending, based on a preference for the first path, a fourth packet according to the first path, wherein the fourth packet is sent before the third packet.

36. The method of claim 35, wherein the first path comprises a wireless access point and the preference is based on the first path comprising the wireless access point.

37. The method of claim 33, wherein the determination of the first throughput is further according to steps comprising:
sending the first packet; and
receiving, based on a timestamp of receipt of the first packet, an indication of bits received according to the first path.

38. The method of claim 33, wherein the first throughput is further determined based on the first path having an accumulation of bits according to a duration satisfying a threshold.

39. The method of claim 38, wherein the accumulation of bits according to the duration satisfying the threshold indicates the first path is idle.

40. The method of claim 33, wherein the parameter of the first path is a first duration of a round trip according to the first path and the parameter of the second path is a second duration of a round trip according to the second path.

41. The method of claim 33, wherein the parameter of the first path is a first ratio of packets lost according to the first path and the parameter of the second path is a second ratio of packets lost according to the second path.

* * * * *